Patented Feb. 20, 1923.

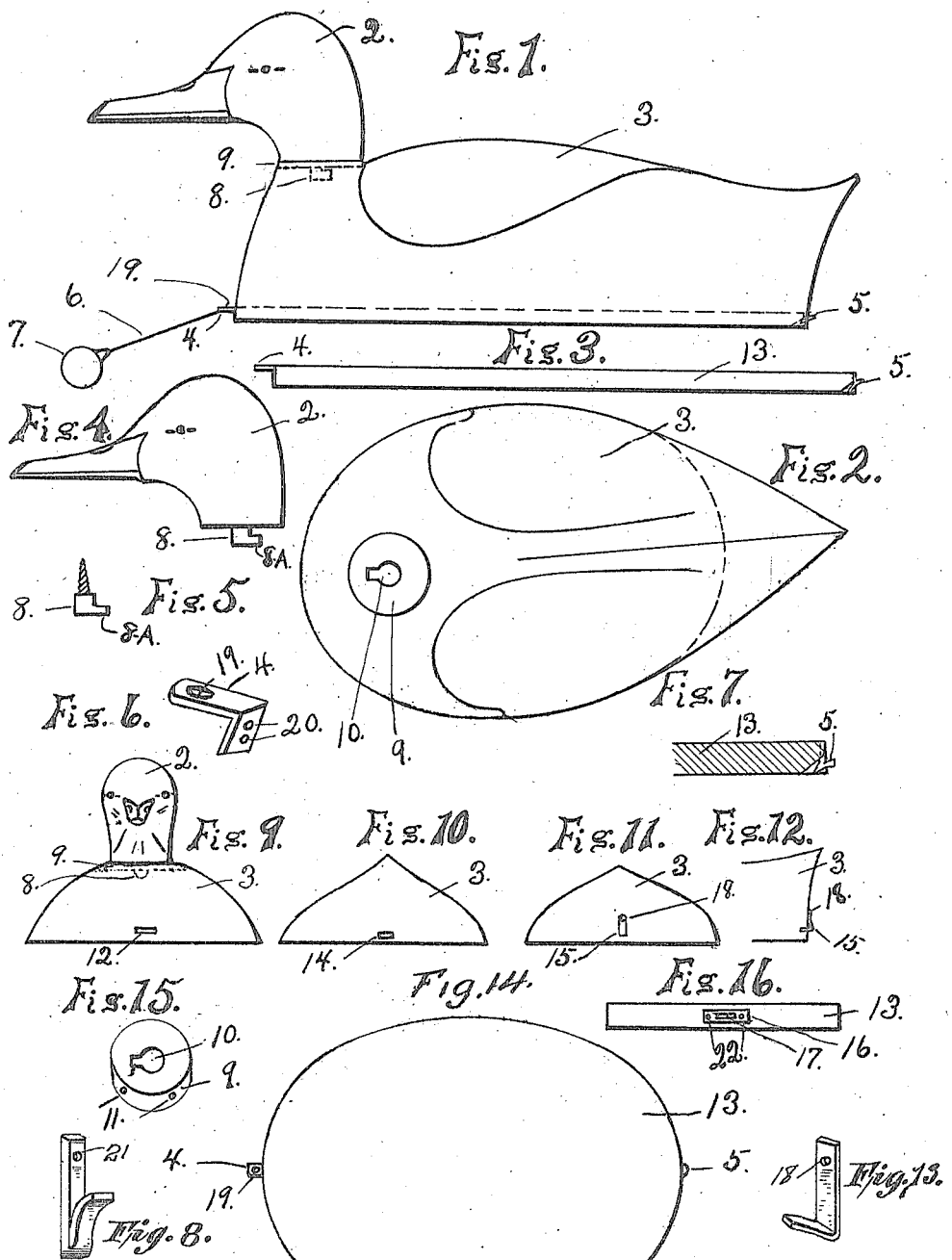

1,445,769

UNITED STATES PATENT OFFICE.

LEIGH G. HURD, OF LOS ANGELES, CALIFORNIA.

DUCK DECOY.

Application filed October 29, 1919. Serial No. 334,347.

*To all whom it may concern:*

Be it known that I, LEIGH G. HURD, a citizen of the United States, residing at Los Angeles, in the county of Los Angeles and State of California, have invented new and useful Improvements in Duck Decoys, of which the following is a specification.

My invention relates to improvements in duck decoys, and particularly to decoys of simple construction and that can be nested together when taken apart, so that the same can be carried in the hunting coat pockets.

Another object is to provide a decoy that is perfect in operation and that has all the advantages of the wooden and pneumatic decoys, but eliminating the disadvantages found in those two constructions.

A further object of my invention is to provide a duck decoy very lifelike in appearance and that can be assembled or taken apart very quickly. Other objects will appear hereinafter.

My invention is illustrated in the accompanying drawing in which:

Figure 1 is a side view of the decoy assembled ready for use, and is the preferred form of my invention. Figure 2, is a top view of the hollow decoy body with head removed. Figure 3, is a side view of the floating bottom on which the body is mounted when in use. Figure 4, is a side view of the removable, adjustable head with the L shaped lug. Figure 5, is a side view of the L shaped lug showing the threaded shank for screwing into the wooden head. Figure 6, is a perspective view of the projecting member, or piece of metal which is attached permanently to the floating bottom. Figure 7, is a side sectional view of the bottom. Figure 8, is a perspective view of the spring fastener or clip, which is attached permanently to the floating bottom. Figure 9, is a front view of the decoy body with the removable adjustable head attached. Figure 10, is a rear view of the hollow decoy body. Figure 11, is also a rear view of the hollow decoy body and shows the spring fastener or clip attached to the same. Figure 12, is an elevational view broken away showing the tail end of the decoy body and the spring fastener or clip. Figure 13, is a perspective view of the spring fastener or clip which is attached permanently to the rear end of the decoy body.

Figure 14, is a top view of the floating bottom on which the decoy body is mounted. Figure 15 is a perspective view of the "head seat" which is attached permanently on the top front end of the decoy body. Figure 16, is an end view of the floating bottom.

The fastening construction shown in Figures 11, 12, 13 and 16, are fully described in my application for Patent No. 406,791, filed Aug. 30, 1920. Attention is also called to Fig. 10 in my application No. 406,791, filed Aug. 30, 1920, which shows two projecting members attached to the end of the floating bottom instead of one as shown in this drawing. The same results are secured by using either method as this is a mere detail of construction. The preferred form however, would be the single projecting member 4 as shown in Fig. 6 of this drawing.

Similar numerals refer to similar parts throughout the different views. Referring more specifically to the drawing, 3 indicates the hollow body of the decoy which is preferably made from stamped sheet metal, the bottom part being open so that the same can be attached to the floating bottom 13. This feature also makes the decoys very easy to carry as the bodies can be nested together when taken apart. In carrying the decoys the bodies 3 are nested together, and the removable heads 2 are then placed in the last decoy body, or in two decoy bodies if the decoys are separated in two lots. The detachable floating bottoms 13 also take up very little room as they can be placed together. The removable adjustable head 2 can either be made from solid wood or from sheet metal. The detachable floating bottom 13 is preferably made from wood, but can be made from any other floating material if so desired. The L shaped lug 8 with the projection 8$^A$, shown in Figure 5, can be screwed permanently into the removable head 2, providing the head 2 is made from solid wood. In case the head 2 is made of sheet metal or other suitable material, the lug 8 can be attached to the head 2 by any other suitable means. The "head seat" 9, shown in Figures 2 and 15 can be made from any suitable material but preferably from metal, and is attached permanently to the decoy body 3 by rivets, screws or by pins, or any other suitable means, as shown at 11 in Figure 15. However the orifice 10 in the "head seat" 9, can be punched out at the same time the body 3 is stamped or formed, in which case the "head seat" 9 would not be a separate part as shown in Figure 15.

The projecting piece of metal or member 4, shown in Figure 6 to be inserted in the orifice 12 is preferably made of brass or other metal that will not rust, and has a hole in the front end of same for inserting the anchor cord 6 as shown at 19 in Figures 1, 6, and 14. Weight 7 is attached to cord 6. The projecting piece of metal or member 4 is attached permanently to the floating bottom 13 by screws or other means inserted in holes as shown at 20, in Figure 6.

In Figure 6, 20 indicates the screw holes. The spring fastener or clip 5, shown in Figure 8 to be inserted in the orifice inserted in holes is attached permanently to the floating bottom 13 by means of a screw or other means being inserted thru hole 21, as shown in Figure 8. In attaching the spring fastener or clip 5 to the floating bottom 13, it is placed diametrically opposite the projecting piece of metal or member 4 on the floating bottom 13, as shown in Figure 14 at 4 and 5.

The spring fastener or clip 15 shown in Figure 13 is permanently attached to the hollow body 3 by inserting a screw, rivet or other means through the hole 18, as shown in Figure 13. Figures 11 and 12 show the spring fastener 15 attached permanently to the hollow body 3. In Figure 16 a metal plate 16 is attached permanently to the floating bottom 13, by means of the screws or nails inserted through screw holes 22. This plate has a slot 17 which is intended to receive the spring fastener or clip 15 when the decoy body 3 is being mounted on the floating bottom 13. The metal plate 16 is attached to the floating bottom 13 diametrically opposite the projecting piece of metal or member 4.

In the operation of the decoy, the projecting piece of metal or member 4, is inserted in the orifice 12 in the hollow body 3, adjacent its open under side as shown in Figure 9. The body 3 of the decoy is then pressed down on the floating bottom 13 until the spring fastener or clip 5 slips automatically into the orifice 14 in the hollow body 3 adjacent its open under side as shown at 14 in Figure 10. This locks the body 3 to the floating detachable bottom 13. The removable adjustable head 2, equipped with the L shaped lug 8, is now positioned on the "head seat" 9, on the top of the decoy body 3, with the bill of the decoy pointing towards the rear if the orifice 10 in the head seat 9 is in the same position as shown in the drawing, although the position of the orifice 10 in the head seat 9 can be changed if desired without departing from the spirit of my invention. The position of the orifice 10 in the head seat 9 shown in the drawing is the preferred position for receiving the L shaped lug 8. In this position as shown in the drawing the L shaped lug 8 with the projection 8^A exactly fits the orifice 10 in the "head seat" 9, and therefore slips into place. By turning the head 2 a fraction of a turn either to right or left securely locks the head 2 to the body 3 in any desired position as can readily be seen. An anchor cord 6 with a weight 7 attached as shown in Figure 1, is now attached to the projecting piece of metal or member 4, by inserting the anchor cord 6 thru the hole 19 in the projecting piece of metal or member 4 and securing same. The decoy is now ready for use. In taking the decoy apart, all that is necessary is to pull the spring fastener 5 out of the orifice 14 in the body 3, when the decoy can be quickly taken apart the same way it was assembled. In assembling the decoy equipped with the spring fastener 15 which is attached permanently to the body 3 instead of the floating bottom 13, the same method is used for putting the decoy together as just described, as the spring fastener or clip 15 snaps automatically into the slot 17 in the plate 16 on the floating bottom 13 when the body 3 is pressed down on the floating bottom 13 as can readily be seen by referring to the drawings.

The decoys in general use at the present time are mostly solid wooden decoys and pneumatic ones. Wooden decoys being heavy are hard to carry besides having the disadvantage of the heads breaking off easily. Pneumatic or collapsible decoys are light and easy to carry, but have the disadvantage of being very fragile, and are therefore a great deal of trouble and annoyance to the sportsman.

It can readily be seen after reading this specification and referring to the drawing, that my invention has all the advantages of the wooden and collapsible decoys, but does not possess their disadvantages. Wooden and collapsible decoys as a general rule sit too high on the water, and generally roll with the waves on account of having round bottoms. Live ducks sitting on the water do not roll, and my decoy having a flat bottom and a low body will not roll, but sits on the water in a natural position. Also as the removable adjustable head can be adjusted to any position, my decoys will have an extremely natural appearance, especially when they are painted in natural colors. It will also be noted by referring to Figure 1 in the drawing, that the anchor cord is attached to the front of the decoy. This is the correct place to attach the cord, as ducks sitting on the water always sit with their heads pointing towards the wind.

Having thus described my invention, what I claim is:

1. A decoy comprising the combination of a hollow body with the bottom part open, a removable head, a detachable floating bottom permanently equipped with a projecting member to be inserted in an orifice in the hollow body adjacent its open under side, said projecting member equipped with means for attaching the anchor cord to the same, and the aforesaid projecting member co-operating with other means in detachably securing the hollow body over the detachable floating bottom.

2. A decoy comprising the combination of a hollow body with the bottom part open, a removable head, a detachable floating bottom equipped with a projecting member permanently attached to the same to be inserted in an orifice in the hollow body adjacent its open under side, and means permanently attached to the floating bottom diametrically opposite the projection member for engaging a second orifice in the hollow body adjacent its open under side, which detachably secures the hollow body over the detachable floating bottom.

3. A decoy comprising the combination of a hollow body with the bottom part open, a removable head, a detachable floating bottom permanently equipped with projecting means and a fastener, said fastener positioned opposite the projecting means, and the aforesaid projecting means and fastener engaging orifices in the hollow body adjacent its open under side when the hollow body is mounted on the detachable floating bottom.

4. A decoy comprising the combination of a hollow body with the bottom part open, a removable head, a detachable floating bottom permanently equipped with a fastener, said fastener co-operating with projecting means permanently attached to the opposite side of the detachable floating bottom, in detachably securing the hollow body over the detachable floating bottom when the fastener and projecting means have engaged orifices in the hollow body adjacent its open under side.

In testimony whereof I have signed my name to this specification.

LEIGH G. HURD.